United States Patent [19]
Lovgren et al.

[11] 3,809,174
[45] May 7, 1974

[54] MOTORCYCLE WITH PROTECTED EXHAUST PIPE SYSTEM

[75] Inventors: Gosta Hjalmar Fredrik Lovgren; Ove Vilmer Lundell, both of Varberg, Sweden

[73] Assignee: Monark-Crescent AB, Varberg, Sweden

[22] Filed: Aug. 21, 1972

[21] Appl. No.: 282,110

[30] Foreign Application Priority Data
Feb. 24, 1972 Sweden.............................. 2273/72

[52] U.S. Cl. ............................. 180/64 A, 180/33 R
[51] Int. Cl........................................... B60k 13/04

[58] Field of Search......... 180/64 A, 30, 31, 32, 33, 180/5 R

[56] References Cited
FOREIGN PATENTS OR APPLICATIONS
875,368   7/1971   Canada.............................. 180/5 R Primary Examiner—Leo Friaglia
Assistant Examiner—David M. Mitchell
Attorney, Agent, or Firm—Young & Thompson

[57] ABSTRACT

An exhaust pipe system including exhaust pipes and mufflers is placed entirely within the horizontal extent of the rest of the motorcycle.

2 Claims, 2 Drawing Figures

MOTORCYCLE WITH PROTECTED EXHAUST PIPE SYSTEM

The present invention relates to an exhaust pipe system for motor-cycles. Normally this system is placed in such a way that it is vulnerable, especially from the sides and therefore will be easily damaged. That is especially noticeable, when the vehicle is driven over rough terrain as the case often is with for instance military motor-cycles.

It is an object of the present invention to provide an exhaust pipe system in which this disadvantage is eliminated.

Figure 1:
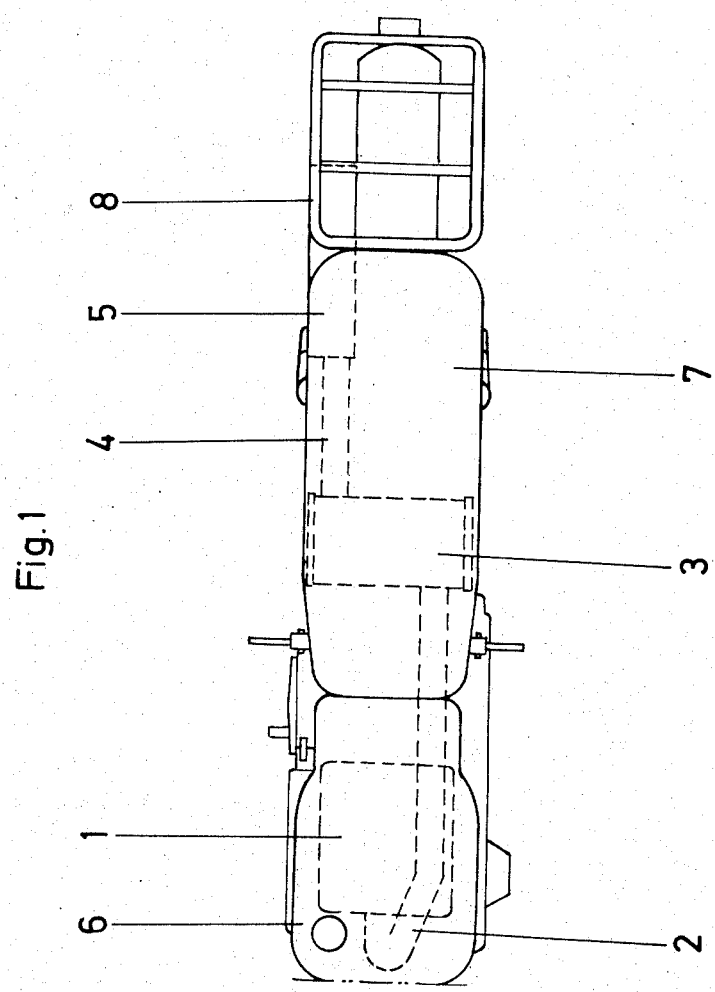
Figure 2:
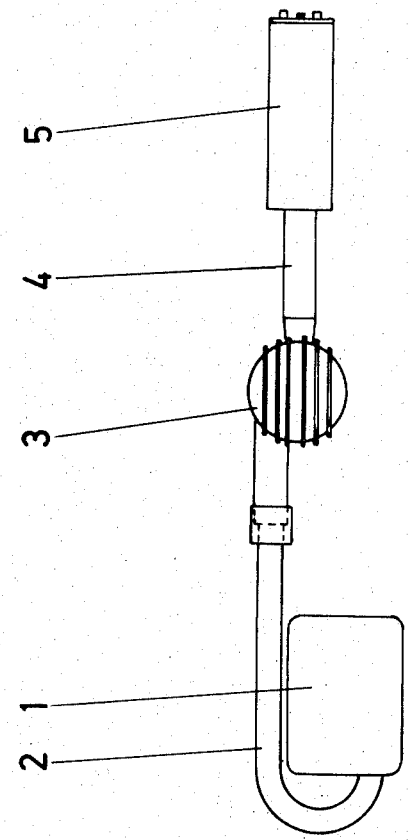

This and other objects of the present invention will become apparent from the following detailed description taken in conjunction with the accompanying drawings in which:

FIG. 1 is a plan view of a part of a motor-cycle provided with the exhaust pipe system according to the invention; and FIG. 2 is a side elevation of the same exhaust pipe system.

Referring now to the drawings 1 designates the engine of the motor-cycle and 2 a front part of an exhaust pipe coming from said engine. This part of the exhaust pipe is U-shaped nearest the engine and is then extended horizontally backwards above the engine and somewhat to the one side of the length axis of the motor-cycle. Immediately in front of the rear wheel the exhaust pipe is changed into a transverse part, which according to a preferred embodiment is formed as a front muffler 3. From this a rear part 4 of the exhaust pipe extends horizontally backwards and on the other side of the length axis of the motor-cycle, which rear part ends in a rear muffler 5.

As is clearly shown on the drawings the exhaust pipe system, when the motor-cycle is seen from above, is placed entirely within the horizontal extent of the rest of the motor-cycle. Thus the front part 2 of the exhaust pipe is placed under the gas tank 6 and the front part of the saddle 7, whereas the front muffler 3 and the rear part 4 of the exhaust pipe is placed under the continuation of the saddle 7, where also the front end of the rear muffler 5 is placed. The rear end of this silencer, which also is the end of the exhaust pipe system, is placed under the luggage carrier 8.

Thereby the whole exhaust pipe system will be protected in an extraordinary way and at the same time it is possible to use two mufflers, which gives an improved exhaust damping.

What we claim is:

1. In a motorcycle having an engine, a gas tank above the engine, a saddle rearward of said gas tank and engine, a luggage carrier at the rear of the motorcycle behind said saddle, and an exhaust pipe system extending from said engine rearwardly above said engine; the improvement in which said exhaust pipe system extends below said gas tank and saddle and is disposed over its entire length substantially within the vertical space which is laterally bounded by said gas tank, saddle and engine, said exhaust pipe system including a front exhaust pipe extending rearwardly from said engine above said engine on one side of the longitudinal midline of the motor-cycle, said front exhaust pipe below said saddle being connected to a transverse part, said transverse part in turn being connected to a rear exhaust pipe and a muffler, said rear exhaust pipe and muffler extending rearward on the other side of said longitudinal midline and below said saddle and below said luggage carrier.

2. A motorcycle as claimed in claim 1, in which said transverse part is a muffler.

* * * * *